United States Patent
Berggren et al.

(10) Patent No.: US 11,968,612 B2
(45) Date of Patent: Apr. 23, 2024

(54) DATA ROUTING IN RADIO ACCESS NETWORK

(71) Applicant: SONY CORPORATION, Tokyo (JP)

(72) Inventors: Anders Berggren, Lund (SE); Lars Nord, Lund (SE)

(73) Assignee: Sony Group Corporation, Tokyo (JP)

(*) Notice: Subject to any disclaimer, the term of this patent is extended or adjusted under 35 U.S.C. 154(b) by 132 days.

(21) Appl. No.: 16/958,392

(22) PCT Filed: Jan. 29, 2019

(86) PCT No.: PCT/SE2019/050070
§ 371 (c)(1),
(2) Date: Jun. 26, 2020

(87) PCT Pub. No.: WO2019/160467
PCT Pub. Date: Aug. 22, 2019

(65) Prior Publication Data
US 2021/0037443 A1     Feb. 4, 2021

(30) Foreign Application Priority Data

Feb. 14, 2018 (SE) .................................... 1850156-9

(51) Int. Cl.
*H04W 40/12*     (2009.01)
*H04W 28/02*     (2009.01)
(Continued)

(52) U.S. Cl.
CPC ....... *H04W 40/12* (2013.01); *H04W 28/0289* (2013.01); *H04W 76/19* (2018.02); *H04W 76/25* (2018.02); *H04W 40/04* (2013.01)

(58) Field of Classification Search
None
See application file for complete search history.

(56) References Cited

U.S. PATENT DOCUMENTS

| 10,986,655 | B2* | 4/2021 | Ryoo | H04W 72/1284 |
| 2018/0092157 | A1* | 3/2018 | Chen | H04W 76/27 |

(Continued)

FOREIGN PATENT DOCUMENTS

| CN | 101273650 A | 9/2008 |
| CN | 101500277 A | 8/2009 |

(Continued)

OTHER PUBLICATIONS

Chinese Office Action from corresponding Chinese Application No. 201980012570.3, dated Jun. 28, 2021, 9 pages.

(Continued)

*Primary Examiner* — Jutai Kao
(74) *Attorney, Agent, or Firm* — Tucker Ellis LLP (57) ABSTRACT

A solution for routing data in a radio access network RAN including a first base station (10), a second base station (20), and a logical inter-node interface (X), wherein the first base station (10) has a pending active session to a core network (110), which session is associated with a terminal (1), while the terminal is suspended from RAN connection. A method comprises detecting a resume attempt from the terminal (1) in the second base station (20); detecting an indicator, received in the second base station (20) from the terminal (1), associated with a characteristic of data to send from the terminal (1); receiving data in the second base station (20) from the terminal (1); forwarding, dependent on said indication, the received data to the first base station (10) over the logical inter-node interface (X) for transmission in the pending active session.

18 Claims, 6 Drawing Sheets

(51) Int. Cl.
*H04W 40/04* (2009.01)
*H04W 76/19* (2018.01)
*H04W 76/25* (2018.01)

(56) References Cited

U.S. PATENT DOCUMENTS

| | | | | |
|---|---|---|---|---|
| 2018/0103465 | A1* | 4/2018 | Agiwal | H04W 74/004 |
| 2018/0234890 | A1* | 8/2018 | Shih | H04W 60/00 |
| 2019/0090298 | A1* | 3/2019 | Abraham | H04W 76/27 |
| 2019/0320467 | A1* | 10/2019 | Freda | H04L 5/0055 |
| 2020/0178113 | A1* | 6/2020 | Jin | H04W 28/0268 |
| 2020/0187245 | A1* | 6/2020 | Fujishiro | H04W 72/0413 |
| 2020/0351782 | A1* | 11/2020 | Kubota | H04W 52/0229 |
| 2022/0124575 | A1* | 4/2022 | Kim | H04W 36/30 |

FOREIGN PATENT DOCUMENTS

| | | |
|---|---|---|
| CN | 105530690 A | 4/2016 |
| WO | 2013142361 A1 | 9/2013 |
| WO | 2016178605 A1 | 11/2016 |
| WO | 2017222344 A1 | 12/2017 |

OTHER PUBLICATIONS

International Search Report and Written Opinion from corresponding International Application No. PCT/SE2019/050070, dated Apr. 2, 2019, 11 pages.
Swedish Search Report and Office Action for corresponding Swedish Application No. 1850156-9, dated Nov. 5, 2018, 9 pages.
Catt, "Handling of data and signalling", 3GPP TSG RAN WG3 Meeting #95bis, R3-170986, Apr. 3, 2017, 4 pages.
Qualcomm Incoprorated, "Small data transmission in inactive state", 3GPP TSG-RAN WG3 NR Ad Hoc Meeting, R3-170158, Jan. 12, 2017, 4 pages.
Huawei, et al., "Summary of email discussion [NR-AH1#13] [NR] UL data in Inactive", 3GPP TSG-RAN WG2 #97, R2-1701125, Feb. 8, 2017, 50 pages.

* cited by examiner

DATA ROUTING IN RADIO ACCESS NETWORK

TECHNICAL FIELD

This disclosure relates to methods and devices in a radio communication system, comprising a radio access network and a wireless terminal. Specifically, solutions are provided for managing an uplink connection from a terminal which is suspended from connection to the radio access network, while a connection associated with that terminal is maintained in the radio access network.

BACKGROUND

In radio communication systems, such as various generations provided through the 3rd Generation Partnership Project (3GPP), various generations of specifications have been provided for setting up common rules for setting up and operating both a wireless radio interface between a wireless terminal and a base station, and various levels of operation of the network. In 3GPP documentation, a terminal is commonly referred to as a User Equipment (UE). A base station, operative to provide radio access to terminals within a cell, also referred to herein as a node or access node, and various terms are used in 3GPP for different types of systems or specification. In the so-called 3G specifications, also referred to as the Universal Mobile Telecommunications System (UMTS), the term NodeB is used to denote a base station, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology.

For many types of radio communication systems, different states may be defined in which operation of the various parties may take different form. Generally, at least two different states may be defined in most types of a radio communication systems.

In an idle state, the terminal will be held in an idle mode in which it is not currently transmitting or receiving data. In such a state, the terminal may e.g. periodically listen to signals transmitted from base stations for the purpose of maintaining minimum contact with the network through a base station of a cell to which the terminal camps, e.g. to maintain synchronization, listen for system information and be prepared for receiving a paging message in case there is downlink traffic addressed to the terminal.

In connected state or active state, one or more radio resources have been provided to the terminal forming an active dedicated connection through a base station, for reception or transmission of data. The terminal will then be in a connected mode.

Going from an idle state to a connected state hence involves an access procedure, to set up an active radio link for data communication. Such an access procedure is normally initiated on a random access channel (RACH), and will not be outlined in detail herein. However, when a terminal initiates going to a connected state, this may involve signaling and message communication with another cell and base station, than a last base station through which the terminal had an established connection in a connected state. However, efforts in 4G and 5G have been made to reduce the overall system signaling. In 4G the feature is called User Plane CIoT optimization and in 5G it is called RRC_Inactive. Both solutions are based on that information related to the terminal's connection is stored and reused using Suspend and Resume functionality. In a system where a context or connection data is stored or maintained in a last used base station, and a terminal later initiates network connection though another base station either based on paging message related to Downlink traffic, or initiates the RACH procedure based on Uplink traffic, the setup of an connection may still involve a fair amount of processing and signaling at least within the radio access network, before any data packets may be routed to the core network.

SUMMARY

A general object is to provide a solution for data routing in a radio access network, particularly in a situation when a terminal which has been suspended from connection to the network attempts to get connected through one base station for sending data, and information relating to a previous connection is stored in another base station. In the following embodiments the corresponding connection between the RAN node and the core network for the UE can either be suspended or active. To cover both cases, we name the connection between the RAN node and Core Network a Pending Active Session.

According to a first aspect, a method is provided for routing data in a radio access network RAN including a first base station, a second base station, and a logical inter-node interface, wherein the first base station has a pending active session to a core network, which session is associated with a terminal, while the terminal is suspended from RAN connection, comprising detecting a resume attempt from the terminal in the second base station;

detecting an indicator, received in the second base station from the terminal, associated with a characteristic of data to send from the terminal;

receiving data in the second base station from the terminal;

forwarding, dependent on said indication, the received data to the first base station over the logical inter-node interface for transmission in the pending active session.

In one embodiment, detecting a resume attempt includes receiving a resume request message from the terminal.

In one embodiment, detecting a resume attempt includes, prior to receiving the resume request message receiving an access request message from the terminal, sending an access request response message.

In one embodiment, said indicator is embedded in said access request message.

In one embodiment, the access request response message includes a grant to embed data in the resume request message.

In one embodiment, said data is attached to a resume request message.

In one embodiment, the method comprises receiving an acknowledgement from the first base station associated with the forwarded data;

sending a message to the terminal to terminate connection setup to the RAN.

In one embodiment, said indicator is embedded in said access resume request message.

In one embodiment, said indicator is embedded in an access resume completion message from the terminal.

In one embodiment, the method comprises, prior to receiving data, determining to forward data based on said indicator, sending a resume response message to the terminal.

In one embodiment, said characteristic is an amount of data to be sent from the terminal.

In one embodiment, said indicator is configured to indicate that the amount of data to be sent does not exceed a predetermined threshold.

In one embodiment, said indicator provides a measure of the amount of data to be sent.

In one embodiment, said indicator is configured to indicate that the amount of data to be sent may be included within a resume request message from the terminal.

In one embodiment, said indicator includes a buffer status report.

In one embodiment, said characteristic is latency of data to be sent from the terminal.

In one embodiment, said indicator is configured to indicate low latency.

In one embodiment, said indicator provides a measure of required latency of data to be sent.

In one embodiment, said indicator is associated with a quality of service class indicator for the data to be sent.

In one embodiment, the method comprises suspending the terminal from connection with the RAN after forwarding the data.

In one embodiment, the method comprises, after forwarding the data
making a path switch in the RAN, from the session between the first base station and the core network, to a session between the second base station to the core network, associated with the terminal.

In one embodiment, the method comprises
resuming connection of the terminal, dependent on the indicator, by either
carrying out said forwarding, or
making a path switch in the RAN, from the session between the first base station and the core network, to a session between the second base station to the core network, associated with the terminal.

In one embodiment, the method comprises
identifying said first base station based on a resume ID received from the terminal.

In one embodiment, the method comprises
sending a resume ID, received from the terminal, from the second base station to the first base station.

According to a second aspect, a method is provided for routing data in a radio access network RAN including a first base station, a second base station, and a logical inter-node interface, wherein the first base station has a pending active session to a core network, which session is associated with a terminal, while the terminal is suspended from RAN connection, comprising
receiving data in the first base station, forwarded from the second base station over the logical inter-node interface, which data originates from the terminal;
sending the data to the core network over the pending active session.

In one embodiment, the method comprises
receiving a resume ID in the first base station from the second base station, associated with the pending active session.

According to a third aspect, a base station of a radio access network RAN is provided, wherein said RAN has an interface to a core network, said base station comprising
a wireless interface for terminal communication;
a logical inter-node interface to a further base station of the RAN;
a control unit including a data memory holding computer program code, and a processing device configured to execute the computer program code, wherein the control unit is configured to control the base station to
detect a resume attempt from a terminal which has been suspended from RAN connection;
detect an indicator, received from the terminal, associated with a characteristic of data to send from the terminal;
receive data from the terminal;
forward, dependent on said indication, the received data to the further base station over the logical inter-node interface for transmission in a pending active session between the further base station and the core network.

In various embodiments, the base station may be configured to carry out any of the steps provided for the second base station in the method steps outlined above.

According to a fourth aspect, a base station of a radio access network RAN is provided, wherein said RAN has an interface to a core network, and is configured to hold a pending active session to the core network, which session is associated with a terminal while the terminal is suspended from connection to the RAN, said base station comprising
a wireless interface for terminal communication;
a logical inter-node interface to a further base station of the RAN;
a control unit including a data memory holding computer program code, and a processing device configured to execute the computer program code, wherein the control unit is configured to control the base station to
receive data in forwarded from the further base station over the logical inter-node interface, which data originates from the terminal;
send the data to the core network over the pending active session.

In various embodiments, the base station may be configured to carry out any of the steps provided for the first base station in the method steps outlined above.

In one embodiment, the base station may be configured to receive a resume ID from the further base station, associated with the pending active session.

According to a fifth aspect, a terminal configured for communication with a radio access network RAN is provided, the terminal comprising
a transceiver, and
a control unit including a data memory holding computer program code, and a processing device configured to execute the computer program code, wherein the control unit is configured to control the terminal to
initiate resumption of connection with the RAN while the terminal is suspended from a previous connection with the RAN;
send, dependent on characteristic of data to send, an indicator associated with said characteristic, for reception in a RAN base station;
send said data to the RAN.

In one embodiment, the terminal may be configured to
send said indicator in an access request message;
detect a grant to include the data in a resume request message, received from the RAN;
send the data in a resume request message, including a context of said previous connection.

BRIEF DESCRIPTION OF THE DRAWINGS

Various embodiments will be described with reference to the drawings, in which.

DETAILED DESCRIPTION

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various embodiments are outlined herein, generally suitable for employment in a 3GPP radio communication network. For this reason, the term UE is frequently used to denote a terminal, and NB, eNB or gNB are terms used to denote a radio access node or base station. A Radio Access Network (RAN) may include a number of base stations, which are connectable to a Core Network (CN).

In LTE, a UE may be in idle or connected mode, with respect to the network. An idle UE has no dedicated signalling or data bearers associated with it. In other words, no network/radio resources are specifically allocated to it. An idle UE's location is known to the network only within a contiguous groups of cells, called tracking area. While an idle UE is not attached to any base station, it is required to select a suitable cell and camp on it. The procedure of an idle UE selecting and camping on a cell is known as Cell Selection. An idle UE, while camping on a cell, continues to regularly monitor the signal quality of the camped cell. In case a quality level criteria is met, (e.g. the signal quality is lower than a threshold), the UE may monitor other cells and may decide to camp on another cell if radio conditions indicates a benefit to do so, for example, due to UE mobility. This process is known as Cell Reselection. The criteria to be adopted by an idle UE for selecting/reselecting a cell are communicated to the UE via the system information broadcast messages periodically by each cell.

In the 5G network a new operational state is defined, called Inactive State or RRC_Inactive. In this state, the UE is still in CM_Connected state in the CN, meaning that there is a pending active session to the CN, which session is associated with the UE. More specifically, this may involve maintaining active interfaces between the RAN and the CN, including N2 (signaling interface between RAN and CN) and N3 (user data interface between RAN and CN). These interfaces are maintained active within the base station where the last traffic was performed, typically the last base station to which the UE was connected in RRC_Connected state. From a RAN perspective the UE is "IDLE/SUSPENDED" with the UE context stored in RAN, meaning that the UE will perform similar tasks as when the UE is in idle mode.

One difference, from the UE point of view, between RRC_Inactive and RRC_Idle is the area the UE needs to monitor, or the area where the UE can reselect cells without informing the network. In the state RRC_IDLE and CM_Idle, where the UE is in idle mode, the UE monitors the registered area (RA) which could be a TA or a list of TA's. If the UE moves out of this Area, the UE needs to perform mobility registration. In the state RRC_Inactive, wherein the UE is also in idle or suspended mode, the area is configured by RAN and it is called a RAN Notification Area (RNA). If the UE moves out of the RNA the UE needs to perform RNA update due to mobility.

The RNA may consist of a number of cells that are connected to a last connected cell or base station, also referred to as an anchor cell. The RAN anchor cell is the RAN node that has the N2 and N3 interface to the CN (Control plane and User plane). These interfaces are similar to the S1-C and S1-U interfaces of LTE. The base stations of the other cells of the RNA are connected to the anchor cell base station by means of a logical inter-node interface. In 5G, this interface, or set of interfaces, is referred to as Xn interface, and has a similar purpose as the X2 interface defined for LTE. The Xn interface is used between two gNBs connected to the CN and supports several functions. This includes control plane functions such as interface management and error handling, connected mode mobility management, support of RAN paging etc, and user plane functions such as data forwarding and flow control.

Figure 1A:
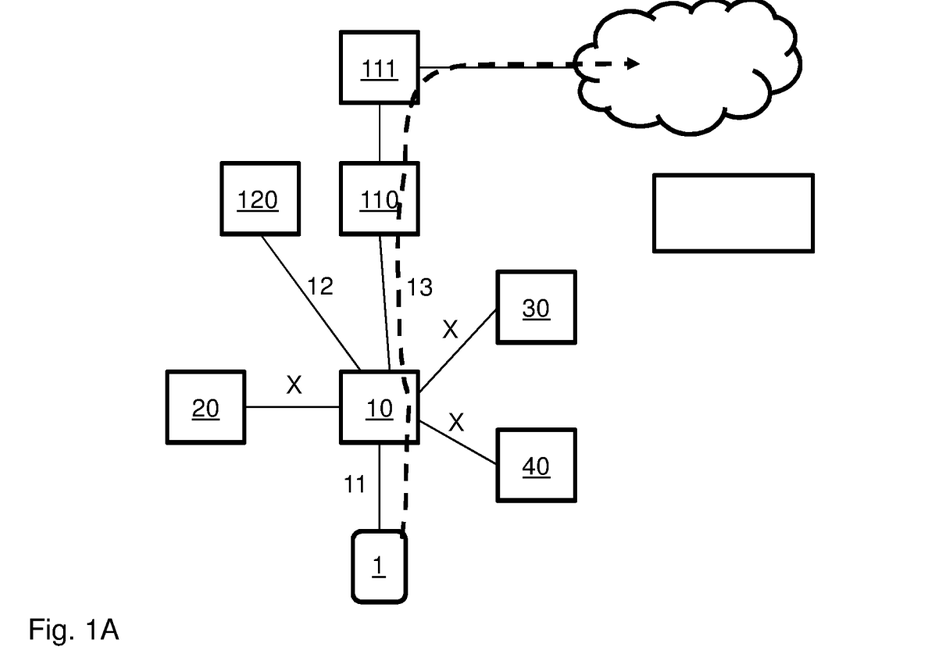
FIGS. 1A and 1B illustrate connection and reconnection of a terminal to a radio access network through different base stations, while being suspended from connection there between, involving a path switch.
Figure 1B:
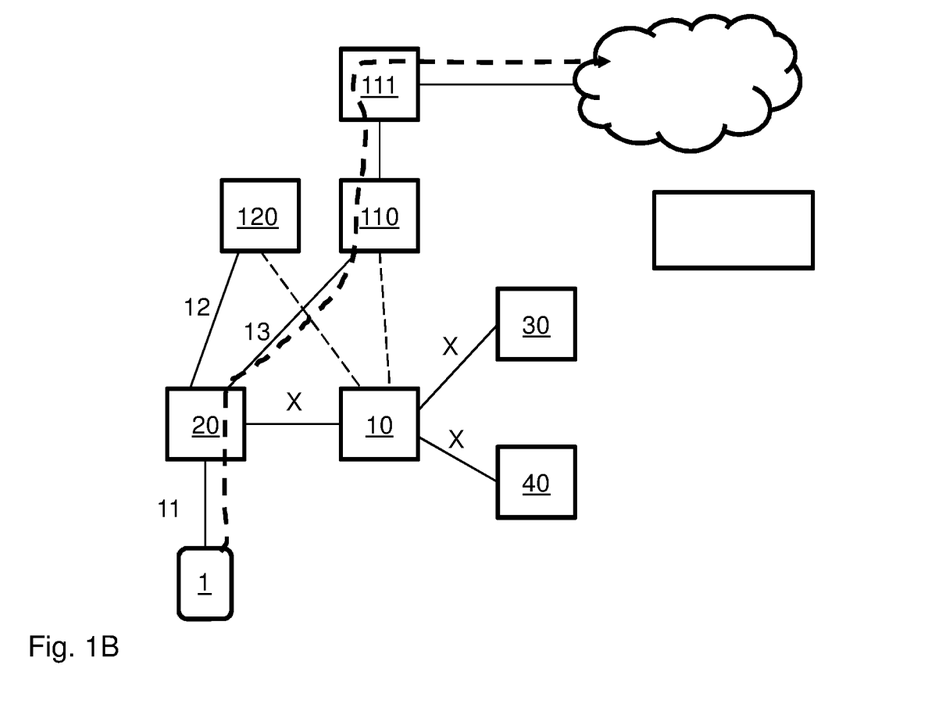

FIG. 1 illustrates a scenario related to two instances of a UE 1 in connected mode, separated by movement of the UE 1 while in RRC Inactive, i.e. when the UE 1 is suspended from connection to the network while a pending active session to the CN is maintained.

More specifically, in FIG. 1A, a UE 1 has an established connection over the air interface Uu 11 to a first base station 10, for uplink transmission of data as indicated by the dashed arrow. There are control plane and user plane interfaces towards the 5G CN, here represented by 120 a combined node of the Access & Mobility management Function AMF and the Session Management Function (SMF) and a User Plane Function UPF 110, and the associated reference points are called N3 13 and N2 12. When the UE 1 terminates transmission of data, it is suspended from network connection. However, since the state RRC_Inactive is present, the context of the UE is maintained in the base station 10 where the pending active session to the core network is maintained through N2 12 and N3 13.

In FIG. 1B, the UE 1 has again initiated connection with the network, for the purpose of transmitting data, but now with a different base station 20. If the UE 1 moves into a cell that is still in the RNA and initiate uplink traffic the specification today say that the N2 12 and N3 13 interfaces should be moved to the new serving cell or base station 20, as indicated in the drawing. This is called a path switch. Performing the path switch involves some network signaling internal to the network and adds latency for the first packet to be sent. This method makes sense in case there will be a reasonable amount of UL data sent. But if the UL data is small or/and the nature of the data traffic is requiring a low latency connection, then this path switch adds inefficiency. The inefficiency is not only the path switch at the UL data transmission instance, but also when the UE returns to RRC_Inactive. When the UE returns to RRC_Inactive the UE will be configured with a new RNA around the new RAN anchor cell 20.

It may be noted that same observation is applicable for User Plane CIoT optimization in EPC, using SUSPEND and RESUME to quickly restore the Uu and S1 reference points (interfaces 12, 13), where the S1 interfaces correspond to the N2 and N3 interfaces in the drawing, as noted earlier.

According to a general presentation of the solutions presented herein, it is suggested that in case a terminal is attempting small data transmission or low latency connection, the UL data should preferably be forwarded from the base station to which the terminal initiates access to resume connection, to the base station which maintains the active interface for a connection associated with the terminal. For an exemplary embodiment in 5G, and with reference to FIG. 2B, this may involve forwarding data received from the UE 1 in the new RAN node 20 to the RAN anchor node 10, directly over the logical inter-node interface Xn, indicated as X in the drawing. Access Stratum AS security will take place in the RAN anchor node 10 before further forwarding of data to the user plane function UPF 110 over interface N3 13. In case of Non Access Stratum NAS message, the RAN anchor node 10 will forward the NAS message over the active N2 12 interface. No path switch will be executed and when the UE returns to idle/suspended mode in RRC_Inactive the same RNA may be used.

A corresponding solution may be implemented for an Evolved Packet Core EPC embodiment, where the base stations comprises one or more eNB 10, 20, 30, 40, between which there may be a logical inter-node interface X, referred to as X2. In such an embodiment, the corresponding interface S1_MME 12 (sometimes called S1_C) may be provided between an anchor cell 10 and a Mobility Management Entity MME 120, and an interface S1_u to a Serving Gateway 110 and forward to a PDN Gateway 111. When a connection of a UE 1 is set up for User Plane CIoT optimization, security and RRC connection reconfiguration procedures are done in the same way as for LTE. Also the RRC connection re-establishment procedure is defined for this case. For Control Plane CIoT optimization, these procedures are typically not applied. When the eNB 10 releases the connection, it may also suspend the UE 1. In this case, the UE 1 transits to the RRC_IDLE state and stores the current AS context. It may resume later the RRC_CONNECTED state with that context. Radio bearer are automatically set up, and security is activated with updated keys. In an embodiment applicable to CIoT optimization, it is here suggested that, if an attempt to resume connection for the suspended UE 1 is detected at another eNB 20, that eNB 20 will then be configured to forward received user data from the UE 1, for further transmission to the CN, through the logical inter-node interface X2, noted as X in FIG. 2B. This forwarding is preferably carried out dependent on an indicator received from the UE 1, associated with a characteristic of the data it is attempting to send, such as small data transmission or low latency connection.

In various embodiments, the RAN will take a decision on whether or not to forward user data through the logical inter-node interface X, or to make a path switch. In various embodiments this decision may be taken by default, by proceeding with certain actions dependent on received information, or by assessing such received information before taking action. In various embodiments, a basis for proceeding with forwarding of user data rather than making a path switch is based on the data to be transmitted in uplink from the UE 1 is small in terms of amount, or if the data requires low latency.

To determine whether the data is small, the new RAN node 20 may in various embodiments check an indicator received from the UE 1, associated with a characteristic of data to send from the UE 1. In one embodiment, this may take the form of a small data indicator in Random Access RA msg1. This may also entail inclusion of the data already in a subsequent message containing a resume request, as will be outlined below. In another embodiment, a small data indicator may be sent in a subsequent message, such as a msg3 of a random access procedure, which includes a resume request. In yet another embodiment, the Buffer Status Report (BRS) received when the UE 1 subsequently request Uu resources may be assessed and determined to be a small data indicator, when the data to be transmitted is deemed to be sufficiently small according to certain predetermined criteria. Such criteria may include a predetermined data amount level, which may also be dependent on other parameters such as traffic load in the network.

For low latency detection, it is possible to send an indicator included in an access request message msg1 or in a resume request message 3. The indicator may be explicit, in the sense that it may be detected in the receiving node 20 to determine that forwarding over the inter-node interface X is preferred. Alternatively, it may be predefined for a certain type or class of UEs, which type or class can be gathered from either msg1 or msg3 can be detected by the receiving node 20, in which case indicator will be implicit. In another embodiment, the receiving node 20 may detect what PDU session is resumed and the corresponding Quality of Service QoS level, such as a low latency 5QI, wherein this QoS level may serve as said indicator. This may be detected from a subsequent message msg5 which includes a first NAS message which completes RRC connection.

Various embodiments will now be described with reference to the drawings. For these embodiments, the general term base station will be used to denote an access node of a radio access network. The radio access network typically includes a plurality of base stations. In the context of the embodiments outlined herein, at least the two base stations discussed for part of a common logical are, such as a RA or an RNA. For the example of a 3GPP type network, the base station may e.g. be a gNB of a 5G network configured to operate in an RRC Inactive state, or an eNB of a network configured for User Plane CIoT optimization, as exemplified. Reference will be made to a terminal as a wireless communication device configured for setting up, and sending and receiving data by, wireless radio connection with the base stations. In 3GPP terms, such a terminal may be denoted a UE. However, it should be noted that the disclosed embodiments may apply to other types of communication networks, where a terminal may be suspended from connection from the radio access network, while maintaining an active interface associated with that terminal in the access network.

Generally, these embodiments relate to a method for routing data in a radio access network RAN including a first base station 10, a second base station 20, and a logical inter-node interface X, wherein the first base station 10 has a pending active session to a core network, here represented by one node, function or core network entity 110. This session is associated with a terminal 1, while the terminal 1 is suspended from RAN connection. The method may include detecting a resume attempt from the terminal 1 in the second base station 20;

detecting an indicator, received in the second base station 20 from the terminal 1, associated with a characteristic of data to send from the terminal 1;

receiving data in the second base station 20 from the terminal 1;

forwarding, dependent on said indicator, the received data to the first base station 10 over the logical inter-node interface X for transmission in the pending active session. Generally, these embodiments also correspond to what has been described with reference to FIGS. 2A and 2B.

Figure 3:
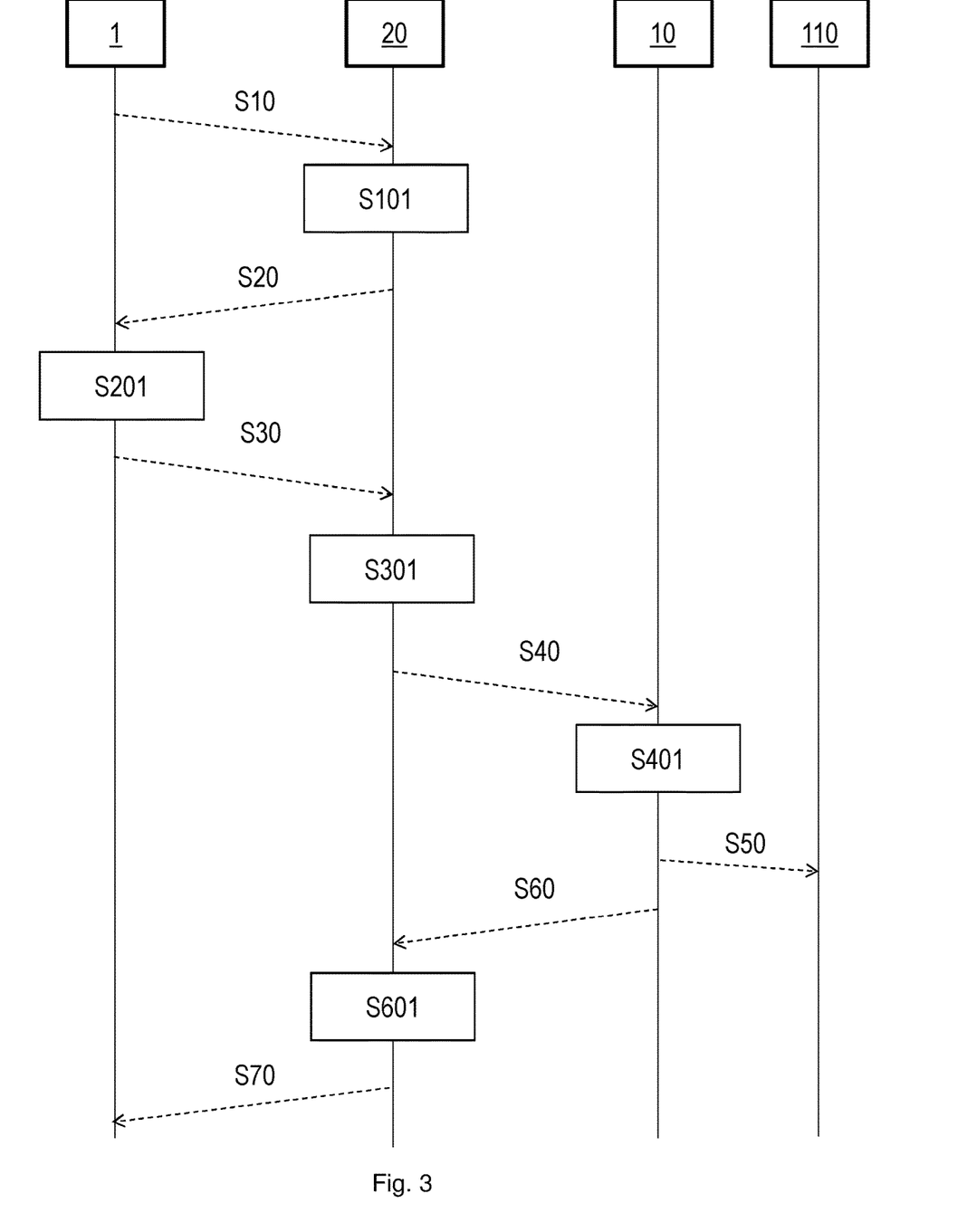
FIG. 3 schematically illustrates various steps of several embodiments of a method according to a first scenario.

FIG. 3 illustrates one such embodiment, where a pending session in the RAN is associated with a terminal 1, while the terminal 1 is suspended from RAN connection. In this suspended mode, the UE 1 initiates reconnection to the RAN network. This may be initiated with or preceded by a step of sending S10 a random access message, which may be a msg1 message. The terminal seeks to transmit small data, in this context meaning a limited amount of data. The terminal is configured to send an indicator to the RAN, associated with a characteristic of data to send. This serves to notify the RAN that a limited amount of data is to be sent. Where uplink data transmission may be executed by resumption of an existing connection, and another base station 10 than the base station 20 receiving the indicator maintains a context and an active interface to the Core Network, associated with the terminal 1, the indicator provides a basis for the RAN to decide to forward the data to that other base station 10 rather than to make a path switch.

In step S101, a base station 20 receives and detects the random access message sent in step S10, and detects said indicator. In one embodiment, the indicator may indicate that the amount of data to be sent by the terminal 1 may be included within a resume request message from the terminal 1. This may be e.g. indicated by a flag, or one or more predetermined bits in the random access message. The extent of data that may fit and be included in a resume request message may be prescribed by or implicit from specification of a radio communication standard and may be limited to a certain number of bytes.

In a step S20 the base station 20 may respond to the random access message by sending a random access response RAR. Where the base station 20 detects that an indication is received in message S10 that the terminal seeks to transmit small data included in a resume request message, the base station 20 may optionally send a grant to include data in the resume request message. This grant may be included in the RAR message of step S20.

In a step S30, the terminal 1 subsequently sends data destined for uplink transmission, which data is received in the base station 20 in step S301. In this embodiment, the data is attached to a resume request message, such as a msg3 of an RRC setup process. In one embodiment, the attached data may be contained in the resume request message. In an alternative embodiment, the attached data may be piggy-backed to the resume request message. In various embodiments, the base station 20 may be configured to send a grant message in a step S20 to the terminal, which grant message provides approval to the terminal to include data in the resume request message. In such an embodiment, the terminal 1 may further be configured to detect and verify such a grant in a step S201, before including the data in the resume request message S30.

In step S40, based on said indication, the base station 20 forwards the received data to the first base station 10 over the logical inter-node interface X for transmission in the pending active session. Preferably, this step is included in a step S301 of detecting, from the resume attempt, such as from the received resume request received in step S30, a resume ID identifying the last connected base station 10, where the active interface to the core network is maintained. The forwarding in step S40 preferably involves sending received data that may be encrypted for over-the-air transmission from the terminal 1 and the RAN, without performing any decryption in the base station 20. Instead, this task may, if required, be handled by the base station 10 in a step S401.

As indicated in step S401, the base station 10, i.e. the anchor node, will subsequently use or resume the pending active session, and send the data to the core network 110 in a step S50. Furthermore, before or after sending the data to the core network 110, the base station 10 may send an acknowledgment ACK signal in a step S60 to the base station 20, indicating that the data is received correctly.

In step S601, upon detecting the ACK sent in step S60, the uplink transmission has been completed, from the view of the receiving base station 20. At this stage, the base station 20 may send a message in a step S70 to the terminal 1 to suspend the terminal from connection with the RAN after forwarding the data. The message sent in step S70 may e.g. include an explicit connection termination code, an instruction for the terminal 1 to go back to idle or suspended mode, or only an ACK that the data has been sent. By this embodiment, limited amount of data may be conveniently sent without actually fully setting up a connection (msg 5 is never sent, in 4G (LTE) called RRC_ConnectionComplete or RRC_ConnectionResumeComplete), and without having to make path switch.

Figure 4:
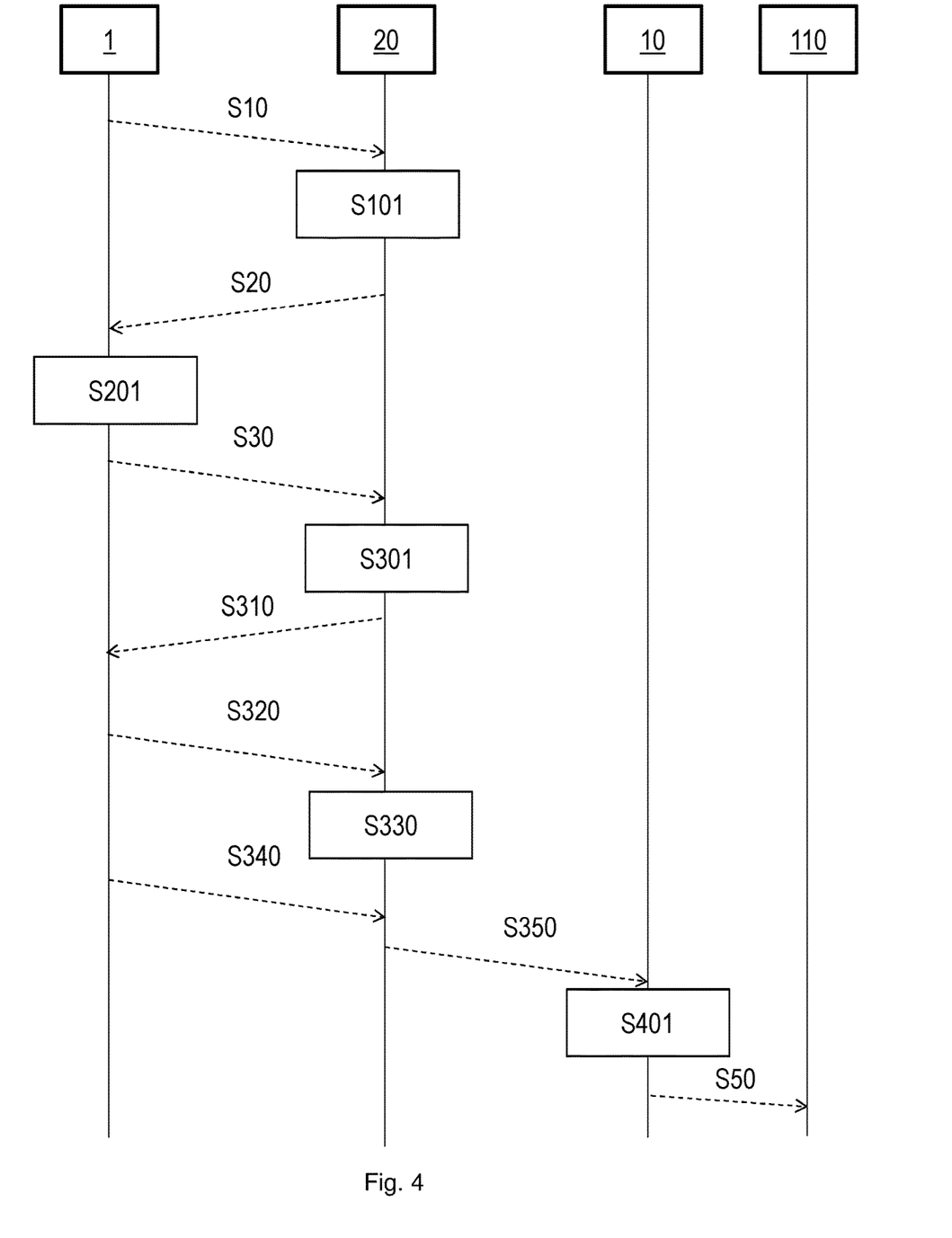
FIG. 4 schematically illustrates various steps of several embodiments of a method according to a second scenario.

FIG. 4 illustrates a method according to another embodiment, where a pending session in the RAN is associated with a terminal 1, while the terminal 1 is suspended from RAN connection. In this suspended mode, the UE 1 initiates reconnection to the RAN network. This may be initiated with or preceded by sending S10 a random access message, which may be a msg1 message. The terminal seeks to transmit small data, in this context meaning a limited amount of data. The terminal is configured to send an indicator to the RAN, associated with a characteristic of data to send. This serves to notify the RAN that a limited amount of data is to be sent. Where uplink data transmission may be executed by resumption of an existing connection, and another base station 10 than the base station 20 receiving the indicator maintains a context and an active interface, associated with the terminal 1, the indicator provides a basis for the RAN to decide to forward the data to that other base station 10 rather than to make a path switch.

In a step S20 the base station 20 may respond to the random access message with a random access response RAR, after detecting the access message in a step S101.

In step S30 the terminal may send a Resume request message, such as in a msg3 of an RRC setup process. The resume request message may include a resume ID identifying the last connected base station 10, where the active interface to the core network is maintained. In such an embodiment, the step of sending S30 the resume request message may be preceded by a step S201 of retrieving the resume ID from memory in the terminal 1. Optionally, this message may also include an indicator associated with the data to be sent from the terminal 1, indicating small data.

Step S301 may involve detecting the anchor node, i.e. the base station 10, based on the received resume request message sent in step S30. This step S301 may include determining that the anchor node 10 is found in the defined area, such as RA or RNA, so that the RRC connection may be reestablished. Step S301 may further include detecting, from the resume request message, an indicator associated with the data to be sent from the terminal 1, indicating small data.

In step S310 a resume acknowledgment response may be sent from the base station 20 to the terminal 1, such as in a msg4 message. This message includes or implicitly indicates to the terminal 1 that the anchor node 10 is found and that the RRC connection may be reestablished.

In step S320 the terminal 1 completes RRC connection, e.g. by sending a msg5 message to the base station 20. The terminal may thereby request resources by signaling a Buffer Status Report BSR, indicating the data to be sent. This step S320 may also include sending a first message to be sent to the core network related to the PDU session that shall be activated.

In a step S330 the base station 20 may look at the BSR and decide whether to make a path switch or forward data, dependent on an indicator received from the terminal 1, indicating small data. In various embodiments, the indicator may have been received in a resume request message sent in step S30 as noted, or even in the first random access message S10. In yet another alternative, the BSR will be taken as an indicator of small data. In such an embodiment, the base station 20 will assess the amount of data indicated in the BSR with regard to a predetermined or calculated level representing a limit for small data. If it is determined from the indicator that the data to come is small, the terminal 20 will grant the scheduling request, but will not perform a path switch.

In step S330, the terminal sends its data to the base station 20.

In step S350 the base station 20 forwards the received data to the first base station 10 over the logical inter-node interface X for transmission in the pending active session to the core network. The forwarding preferably involves sending received data that may be encrypted for over-the-air transmission from the terminal 1 and the RAN, without performing any decryption in the base station 20. Instead, this task may, if required, be handled by the base station 10 in a step S401.

As indicated in step S50, the base station 10, e.g. the anchor node, will subsequently forward the data to the core network 110 by using or resuming connection of the pending active session.

Referring again to FIG. 4, yet another embodiment will now be described, where a pending session in the RAN is associated with a terminal 1, while the terminal 1 is suspended from RAN connection. In this suspended mode, the UE 1 initiates reconnection to the RAN network. This may be initiated with or preceded by sending a random access message in a step S10, which may be a msg1 message.

The terminal seeks to obtain a low latency connection for transmitting data, or in other words latency-sensitive data. The terminal is configured to send an indicator to the RAN, associated with a characteristic of data to send. This serves to notify the RAN that low latency data is to be sent. Where uplink data transmission may be executed by resumption of an existing connection, and another base station 10 than the base station 20 receiving the indicator maintains a context and an active interface, associated with the terminal 1, the indicator provides a basis for the RAN to decide to forward the data to that other base station 10 rather than to make a path switch. This will save signaling and time, which is beneficial for latency-sensitive transmission.

In a step S20 the base station 20 may respond to the random access message sent in step S10 with a random access response RAR.

In step S30 the terminal may send a Resume request message, such as in a msg3 of an RRC setup process. The resume request message may include a resume ID identifying the last connected base station 10, where the active interface to the core network is maintained. In such an embodiment, the step of sending S30 the resume request message may be preceded by a step 201 of retrieving the resume ID from memory in the terminal 1. Optionally, this message may also include an indicator associated with the data to be sent from the terminal 1, indicating low latency. As noted, where applicable, this may include an identification of class or type of terminal, which is configured to be interpreted in the base station 20 as an indication of a low latency connection request.

Step S301 may involve detecting the anchor node, i.e. the base station 10, based on the received resume request message S30. This step may include determining that the anchor node 10 is found in the defined area, such as RA or RNA, so that the RRC connection may be reestablished. Step S301 may further include detecting, from the resume request message, an indicator associated with the data to be sent from the terminal 1, indicating low latency.

In message S310 a resume acknowledgment response may be sent from the base station 20 to the terminal 1, such as in a msg4 message. This message includes or implicitly indicates to the terminal 1 that the anchor node 10 is found and that the RRC connection may be reestablished.

In message S320 the terminal 1 completes RRC connection, e.g. by sending a msg5 message to the base station 20. The terminal may thereby request resources by signaling a Buffer Status Report BSR, indicating the data to be sent.

This step S320 may also include a first message to be sent to the core network related to the PDU session that shall be activated.

In a step S330 the base station 20 may look at the BSR and decide whether to make a path switch or forward data, dependent on an indicator received from the terminal 1, indicating low latency. In various embodiments, the indicator may have been received in a resume request message S30 as noted, or even in the first random access message S10. In yet another alternative, an indication of QoS may be detected from the message received in step S320, such as a QoS Class Identifier QCI, 5QI or similar. In another embodiment, the indicator may be determined based on an identity or indicator of which UE type or which logical channel ID (high priority) of BSR is transmitted.

Based on the indicator, and a predetermined or temporarily calculated rule based on e.g. traffic load in the network, the terminal 20 may determine to forward or make a path switch. If it is determined from the indicator that the data to come is low latency, the terminal 20 will grant the scheduling request, but will not perform a path switch.

In step message S340, the terminal sends its data to the base station 20.

In message S350 the base station 20 forwards the received data to the first base station 10 over the logical inter-node interface X for transmission in the pending active session. The forwarding is preferably involves sending received data that may be encrypted for over-the-air transmission from the terminal 1 and the RAN, without performing any decryption in the base station 20. Instead, this task may, if required, be handled by the base station 10 in a step S401.

As indicated in step S50, the base station 10, e.g. the anchor node, will subsequently forward the data to the core network 110 by using or resuming connection of the pending active session.

In the embodiments discussed with reference to FIG. 4, further steps may be included, so as to terminate or suspend the connection of the terminal 1 after completed transmission of the data. In one embodiment a UE activity timer may be configured to expire, where after the terminal 1 will re-enter RRC_inactive, or is configured to enter RRC_Inactive, e.g. with the same RRC_Inactive configuration as before. No extra signaling/configuration related to the path switch, the assignment of new anchor node, and new RAN Notification Area needs to be made even if the last uplink transmission was carried out with a new base station 20.

With reference to the discussed embodiments, it may be noted that if the base station 20 detects that the indicator is absent, or that it is not deemed as qualifying as small data or latency sensitive, as applicable, in an assessment by the base station 20, a path switch may instead be activated (not shown in FIG. 3 or 4). Hence, the method may include resuming connection of the terminal 1, dependent on the indicator, by either
  carrying out said forwarding, or
  making a path switch in the RAN, from the session between the first base station 10 and the core network, to a session between the second base station 20 to the core network 110, associated with the terminal 1.

In one embodiment, the RAN may be configured to make a path switch once the data has been forwarded. In other words, the base station 20 may be configured to make a path switch in the RAN, from the session between the first base station 10 and the core network 110, to a session between the second base station 20 to the core network 110, associated with the terminal 1. Which may be used for subsequent data uplink transmission. In one embodiment, this may be configured to be carried out after forwarding of a set of small data received from the terminal 1, as indicated by the received indicator. For an embodiment associated with low latency, as described, detection of a transmission gap in a data sent from the terminal 1 may optionally be used for executing a path switch to the receiving base station 20.

In alternative embodiment, a further solution is to always forward the uplink UL data to the old node 10, i.e. the anchor node, and make the path switch later. The same approach may also be valid for downlink DL data, meaning if the RAN paging results in finding the UE in a new cell, associated with a node 20, then the anchor node 10 could be configured to encode the DL data and forward it to the new node 20 over the logical inter-node interface X, where after the new node 20 will deliver the encoded DL data after or during the UE Random access process.

For an uplink case, a method may thus be configured for routing data in a radio access network RAN including a first base station 10, a second base station 20, and a logical inter-node interface X, wherein the first base station 10 has a pending active session to a core network 110, which session is associated with a terminal 1, while the terminal is suspended from RAN connection, comprising
  detecting a resume attempt from the terminal 1 in the second base station 20;
  receiving data in the second base station 20 from the terminal 1;
  forwarding, dependent on said indication, the received data to the first base station over the logical inter-node interface X for transmission in the pending active session.

In one embodiment, the radio access network may be configured to carry out a path switch after the terminal resumes a suspended mode, or when a transmission gap is detected in data sent from the terminal 1. This may involve making a path switch in the RAN, from the session between the first base station 10 and the core network, to a session between the second base station 20 to the core network 110, associated with the terminal 1.

For a downlink case, a method may be configured for routing data in a radio access network RAN including a first base station 10, a second base station 20, and a logical inter-node interface X, wherein the first base station 10 has a pending active session to a core network 110, which session is associated with a terminal 1, while the terminal is suspended from RAN connection, comprising
  receiving a page message or DL data destined for the terminal 1 in the first base station 10 from the core network;
  connecting with the terminal 1 in the second base station 20;
  forwarding or sending the page message from the first base station 10 over the logical inter-node interface X to the second base station 20 for transmission to the terminal 1.

In one embodiment, the radio access network may be configured to carry out a path switch after the terminal 1 resumes a suspended mode, or when a transmission gap is detected in data sent between the terminal 1 and the second base station 20. This may involve making a path switch in the RAN, from the session between the first base station 10 and the core network, to a session between the second base station 20 to the core network 110, associated with the terminal 1.

Figure 5:
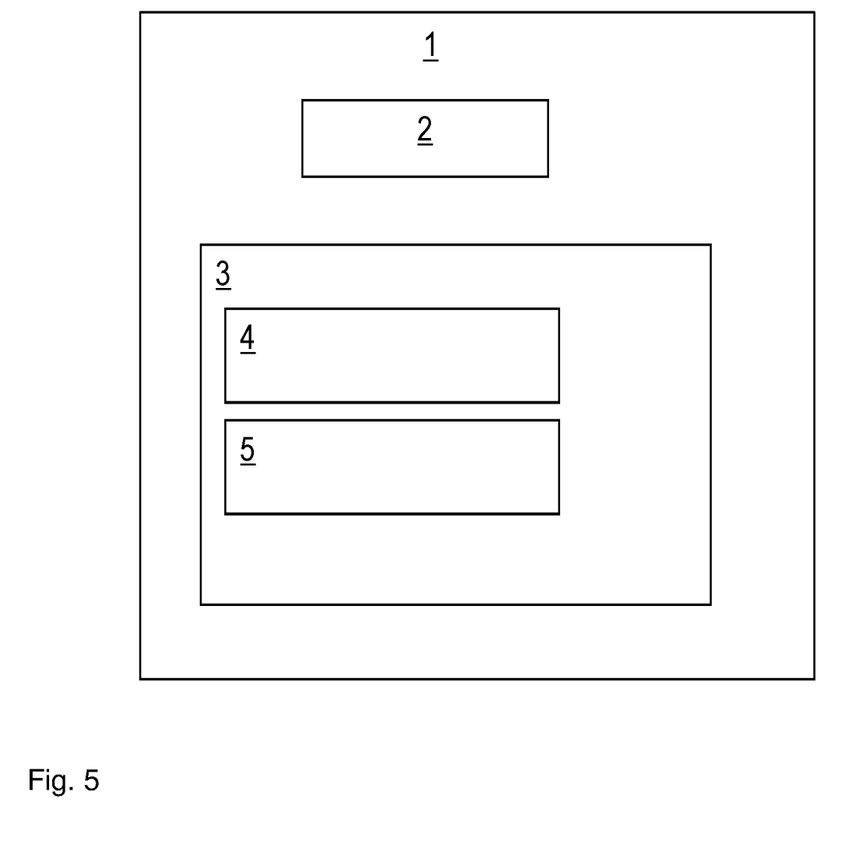
FIG. 5 schematically illustrates elements included in a terminal configured in accordance with an embodiment.

FIG. 5 schematically illustrates a terminal 1 for use in a radio communication system as presented herein. The terminal 1 may e.g. be a mobile phone or other type of user device for radio communication, or a component included in such a device. Alternatively, the terminal 1 may be configured as a machine to machine type device, such an Internet of Things, IoT, device, or similar. Obviously, the terminal may include other features and elements than those shown in the drawing or described herein, such as at least one antenna, power supply, user interface etc.

The terminal 1 may be configured for communication with a radio access network RAN, and comprise a transceiver 2, such as a radio receiver and transmitter for communicating with the RAN through at least an air interface. The terminal 1 further comprises a control unit 3 including a data memory 4, such as a non-volatile memory, holding computer program code, and a processing device 5, such as a microprocessor. The processing device 5 is thereby configured to execute the computer program code from the memory 4, wherein the control unit 3 is configured to control the terminal 1 to initiate resumption of connection with the RAN while the terminal is suspended from a previous connection with the RAN;

send, dependent on characteristic of data to send, an indicator associated with said characteristic, for reception in a RAN base station;

send said data to the RAN.

With reference to the embodiments disclosed herein, the indicator may be associated with an amount of data to send, and/or latency requirement for the data or the connection to be setup.

In one embodiment, the terminal may be configured to
send said indicator in an access request message;
detect a grant to include the data in a resume request message, received from the RAN;
send the data in a resume request message, including a context of said previous connection.

Figure 2A:
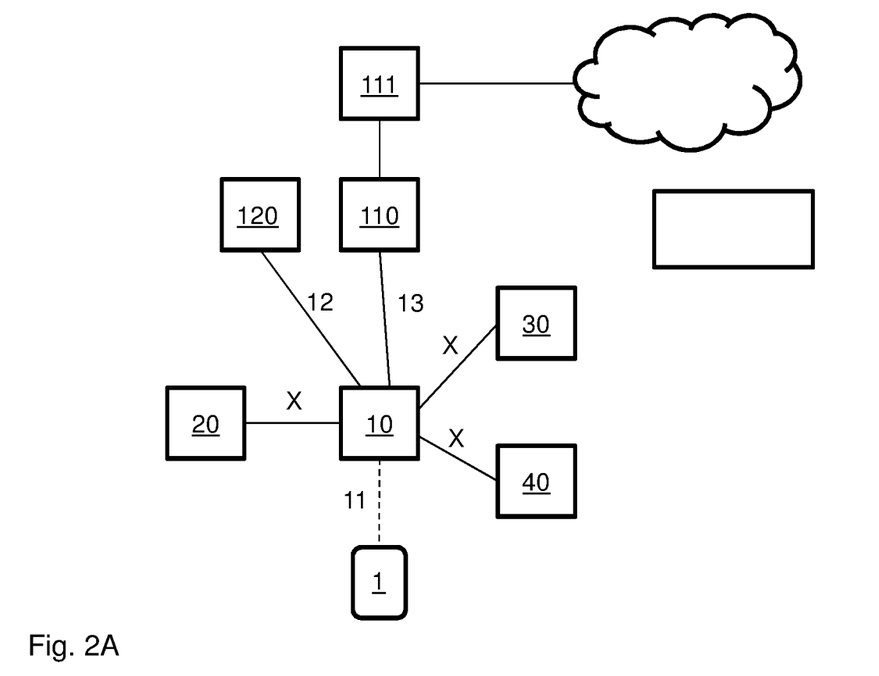
FIGS. 2A and 2B illustrate connection and reconnection of a terminal to a radio access network through different base stations, while being suspended from connection there between, by avoiding a path switch.
Figure 2B:
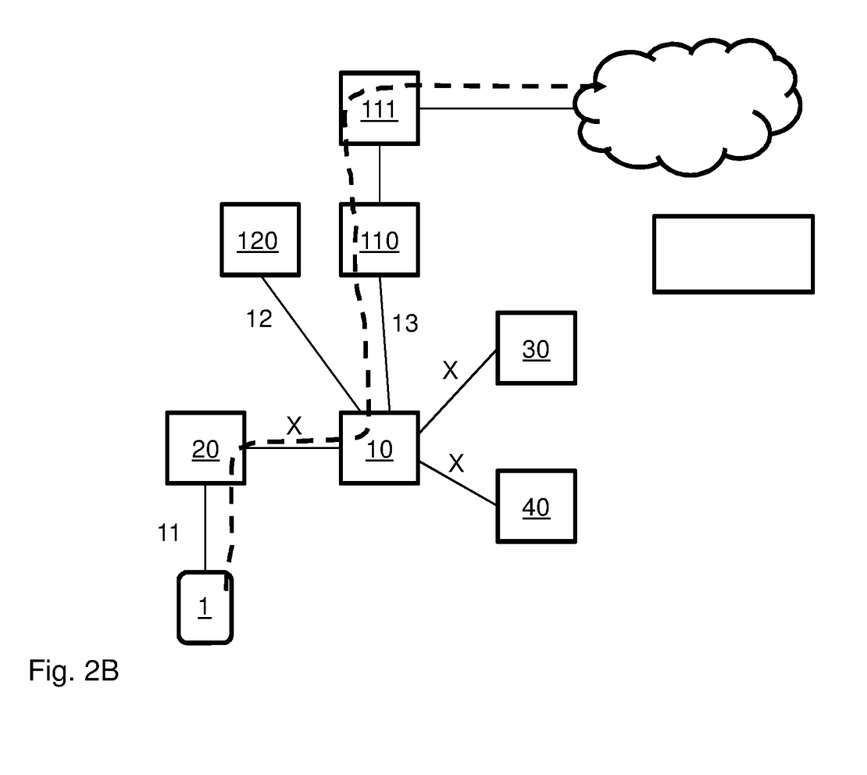
Figure 6:
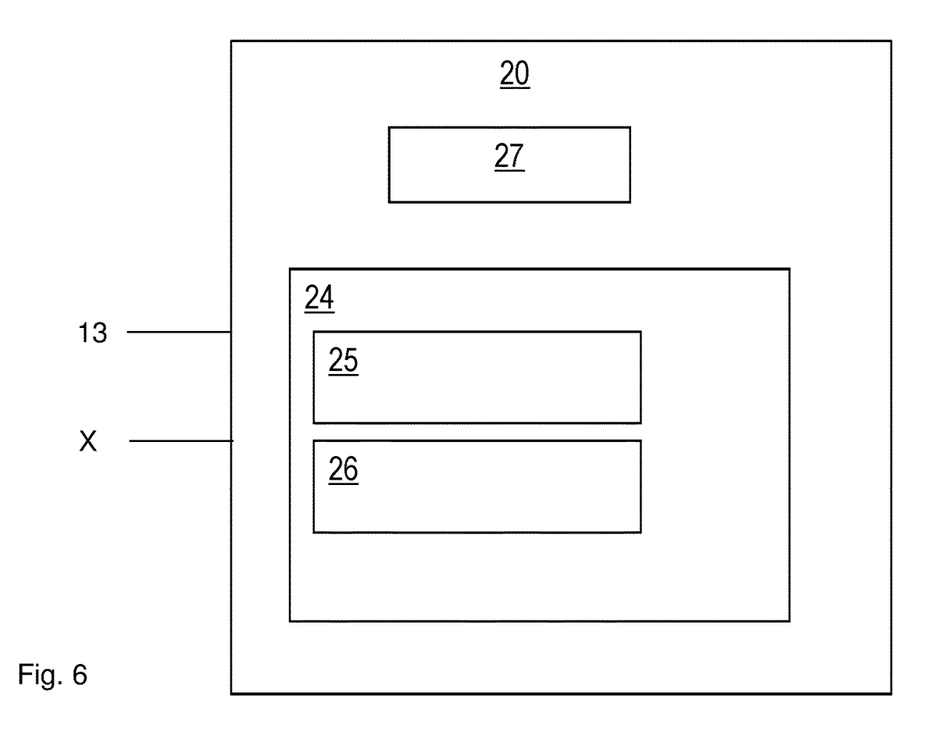
FIGS. 6 and 7 schematically illustrate elements included in base stations configured in accordance with various embodiments.

FIG. 6 schematically illustrates a base station 20 for use in a radio communication system as presented herein, and as illustrated in FIGS. 2A and 2B. As noted, the base station 20 may e.g. be a gNB access node of a 3GPP 5G network, an eNB access node of a 4G network, or other. The base station 20 thus forms part of a radio access network RAN, wherein said RAN has an interface 13 to a core network 110. The base station 20 comprises a wireless interface 27 for terminal communication by radio, and a logical inter-node interface X to a further base station 10 of the RAN, at least within a common dedicated area. The base station 20 further includes a control unit 24 including a data memory 25, such as a non-volatile memory, holding computer program code, and a processing device 26, such as at least one microprocessor, configured to execute the computer program code. The control unit 24 is thus configured to control the base station 20 to detect a resume attempt from a terminal 1 which has been suspended from RAN connection;

detect an indicator, received from the terminal 1, associated with a characteristic of data to send from the terminal;

receive data from the terminal 1;

forward, dependent on said indication, the received data to the further base station 10 over the logical inter-node interface for transmission in a pending active session between the further base station 10 and the core network 110.

The base station 20 may be configured to carry out any of the steps provided for in this disclosure related the base station 20, under control of the control unit 24.

Figure 7:
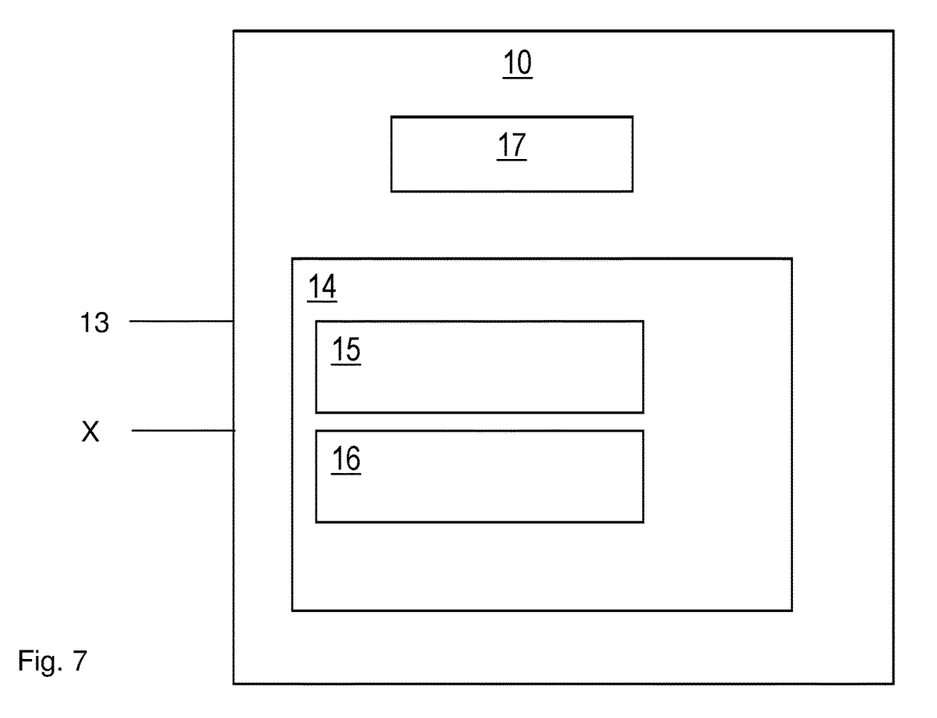

FIG. 7 schematically illustrates a base station 10 for use in a radio communication system as presented herein, and as illustrated in FIGS. 2A and 2B. As noted, the base station 10 may e.g. be a gNB access node of a 3GPP 5G network, an eNB access node of a 4G network, or other. The base station 10 thus forms part of a radio access network RAN, wherein said RAN has an interface 13 to a core network 110. The base station 10 is configured to hold a pending active session to the core network 110, which session is associated with a terminal 1 while the terminal is suspended from connection to the RAN. The base station comprises at least a wireless interface 17 for terminal communication by radio, and a logical inter-node interface X to a further base station 20 of the RAN. The base station further includes a control unit 14 including a data memory 15, such as a non-volatile memory, holding computer program code, and a processing device 16, e.g. one or more microprocessors, configured to execute the computer program code. The control unit is thereby configured to control the base station 10 to receive data in forwarded from the further base station 20 over the logical inter-node interface X, which data originates from the terminal 1; and send the data to the core network 110 over the pending active session, e.g. over interface 13.

The base station 20 may be configured to carry out any of the steps provided for in this disclosure related the base station 10, under control of the control unit 14.

For the base stations 10 and 20, described in exemplary and schematic terms, it may be noted that the base station 10 may be substantially or completely identical to the base station 20. In other words, dependent on the situation and context, i.e. which base station holds an active connection to a core network 110 when the associated terminal is suspended, and which base station is engaged in setting up a radio connection over an air interface Uu, their roles may be changed. Furthermore, in line with what was mentioned for the terminal 1, the base stations 10, 20 may of course include or be operatively connected to further functions or elements, such as one or more antennas, a power supply etc.

The proposed system features, exemplified by methods and devices, will provide an improvement to state of the art radio communication by utilizing a logical inter-node interface for e.g. small data forwarding and/or low latency connection resume in case of UE mobility. The proposed solutions bring about at least the benefits of a reduced signaling, e.g. in case of a UE with limited mobility within a RAN Notification Area, reduced number of path switches (internal network signaling), reduced number of RRC_Inactive reconfiguration of the UE, reduced latency for first packet transmission, and reduced UE power consumption.

Various embodiments have been disclosed herein by way of example, to illustrate various ways of realizing methods and devices falling within the terms of the claims. Unless where specifically noted, these embodiments, or features related to those embodiments, may be combined. More specifically, methods and devices may be configured for indicating, controlling, or determining to forward data based on any or both of an amount of data to be sent or a latency requirement or need.

The invention claimed is:

1. Method for routing data in a radio access network RAN including a first base station, a second base station, and a logical inter-node interface, wherein the first base station has a pending active session to a core network, which session is associated with a terminal, while the terminal is suspended from RAN connection, comprising detecting, by receiving in the second base station a first message comprising a random access message from the terminal, an indicator that indicates that an amount of data to be sent from the terminal does not exceed a predetermined threshold;

receiving, in the second base station, a second message comprising data and a resume request message from the terminal;

proceeding, by decision in the RAN using said indicator as a basis, to either:

forward the received data to the first base station over the logical inter-node interface for transmission in the pending active session without making a path switch, or make a path switch for transmitting the data over an interface between the second base station and the core network instead of forwarding the received data to the first base station.

2. The method of claim 1, comprising:

transmitting, in response to the first message, a random access response message to the terminal.

3. The method of claim 1, comprising receiving, responsive to forwarding, an acknowledgement from the first base station associated with the forwarded data;

sending a message to the terminal to terminate connection setup to the RAN.

4. The method of claim 1, comprising, prior to receiving data:

determining to forward data based on said indicator, and sending a resume response message to the terminal.

5. The method of claim 1, wherein said indicator is configured to indicate that the amount of data to be sent does not exceed a predetermined threshold.

6. The method of claim 1, wherein said indicator includes a buffer status report, wherein the method further comprises:

determining to forward data based on an amount of data indicated in the buffer status report.

7. The method of claim 1, comprising suspending the terminal from connection with the RAN after forwarding the data.

8. The method of claim 1, comprising identifying said first base station based on a resume ID received from the terminal.

9. The method of claim 1, wherein said indicator is configured to provide a measure of the amount of data to be sent.

10. The method of claim 1, wherein said indicator is configured to indicate that the amount of data to be sent may be included within a resume request message from the terminal.

11. The method of claim 1, wherein said indicator is configured to indicate small data transmission.

12. A base station of a radio access network RAN, wherein said RAN has an interface to a core network, said base station comprising:

a wireless interface for terminal communication;

a logical inter-node interface to a further base station of the RAN;

a control unit including a data memory holding computer program code, and a processing device configured to execute the computer program code, wherein the control unit is configured to control the base station to:

detect, from a first message comprising a random access message from the terminal, an indicator that indicates that an amount of data to be sent from the terminal does not exceed a predetermined threshold;

receive a second message comprising data and a resume request message from the terminal, said second message indicating a pending active session associated with the terminal in a further base station to the core network;

proceed, by decision in the RAN using said indicator as a basis, to either:

- forward the received data to the further base station over the logical inter-node interface for transmission in the pending active session without making a path switch, or

- make a path switch for transmitting the data over an interface between the base station and the core network instead of forwarding the received data to the first base station.

13. The base station of claim 12, wherein the base station is configured to transmit, in response to the first message, a random access response message to the terminal.

14. The base station of claim 12, further configured to:

receive, responsive to forwarding, an acknowledgement from the further base station associated with the forwarded data;

send a message to the terminal to terminate connection setup to the RAN.

15. The base station of claim 12, wherein said indicator is configured to indicate that the amount of data to be sent does not exceed a predetermined threshold.

16. The base station of claim 12, wherein said indicator provides a measure of the amount of data to be sent.

17. The base station of claim 12, wherein said indicator indicates that the amount of data to be sent may be included within a resume request message from the terminal.

18. The base station of claim 12, wherein said indicator indicates small data transmission.

* * * * *